(12) United States Patent
Gentry et al.

(10) Patent No.: US 10,274,006 B2
(45) Date of Patent: Apr. 30, 2019

(54) TELESCOPIC ARM FOR A REFUSE VEHICLE

(71) Applicant: The Heil Co., Chattanooga, TN (US)

(72) Inventors: David C. Gentry, Chattanooga, TN (US); Bryan Stewart, Chattanooga, TN (US)

(73) Assignee: The Heil Company, Chattanooga, TN (US)

( * ) Notice: Subject to any disclaimer, the term of this patent is extended or adjusted under 35 U.S.C. 154(b) by 0 days.

(21) Appl. No.: 15/418,684

(22) Filed: Jan. 28, 2017

(65) Prior Publication Data

US 2017/0138394 A1 May 18, 2017

Related U.S. Application Data

(62) Division of application No. 14/452,842, filed on Aug. 6, 2014, now Pat. No. 9,556,898, which is a division
(Continued)

(51) Int. Cl.
*F16C 11/04* (2006.01)
*B66C 23/70* (2006.01)
(Continued)

(52) U.S. Cl.
CPC ............... *F16C 11/04* (2013.01); *B65F 3/00* (2013.01); *B65F 3/041* (2013.01); *B66C 23/54* (2013.01); *B66C 23/701* (2013.01); *B66C 23/707* (2013.01); *F16B 7/10* (2013.01); *F16C 17/02* (2013.01); *F16C 29/02* (2013.01); *F16C 29/12* (2013.01); *F16C 33/26* (2013.01); *F16C 35/02* (2013.01); *B65F 2003/023* (2013.01); *B65F 2003/0266* (2013.01); *F16C 2326/00* (2013.01); *Y10T 403/32* (2015.01);
(Continued)

(58) Field of Classification Search
CPC .......... F16C 11/04; F16C 17/04; F16C 29/02; F16C 29/12; F16C 33/26; F16C 35/02; F16C 2326/00; F16B 17/10; B65F 3/041; B65F 2003/0266; B65F 2003/023; B65C 23/54; B65C 23/701; B66C 23/707; Y10T 403/32; Y10T 403/3057; Y10T 403/32114
USPC .... 384/35–36, 41–42, 59, 99, 129; 414/394, 414/408, 486, 785, 810; 403/66, 71, 403/109.1, 119; 212/250, 350
See application file for complete search history.

(56) References Cited

U.S. PATENT DOCUMENTS

| | | |
|---|---|---|
| 2,592,324 A | 4/1952 | Oliver |
| 2,808,947 A | 10/1957 | Shippy |

(Continued)

FOREIGN PATENT DOCUMENTS

| | | | |
|---|---|---|---|
| CA | 2323471 | 5/2005 | |
| DE | 3216483 A1 * | 11/1983 | ............. B65F 3/045 |

(Continued)

*Primary Examiner* — Marcus Charles
(74) *Attorney, Agent, or Firm* — Fish & Richardson P.C.

(57) ABSTRACT

A telescopic side arm for a refuse vehicle has an inner and outer boom. A mounting assembly secures the outer boom with a refuse vehicle. A plurality of bearing pads is positioned between the inner and outer booms to provide smooth movement between the inner and outer booms. A plurality of shims is associated with the bearing pads to assure a tight fit between the inner and outer booms.

17 Claims, 12 Drawing Sheets

Related U.S. Application Data of application No. 13/790,257, filed on Mar. 8, 2013, now Pat. No. 8,827,559.

(60) Provisional application No. 61/692,378, filed on Aug. 23, 2012.

(51) Int. Cl.

| | | |
|---|---|---|
| F16C 35/02 | (2006.01) | |
| F16B 7/10 | (2006.01) | |
| F16C 17/02 | (2006.01) | |
| F16C 33/26 | (2006.01) | |
| B65F 3/04 | (2006.01) | |
| B66C 23/00 | (2006.01) | |
| B65F 3/00 | (2006.01) | |
| F16C 29/02 | (2006.01) | |
| F16C 29/12 | (2006.01) | |
| B65F 3/02 | (2006.01) | |

(52) U.S. Cl.
CPC  Y10T 403/32057 (2015.01); Y10T 403/32114 (2015.01); Y10T 403/32951 (2015.01)

(56) References Cited

U.S. PATENT DOCUMENTS

| | | |
|---|---|---|
| 2,979,212 A | 4/1961 | Dragonuk |
| 3,033,001 A | 5/1962 | Russell et al. |
| 3,136,436 A | 6/1964 | Erlinder et al. |
| 3,196,979 A | 7/1965 | Garnett |
| 3,462,023 A | 8/1969 | Grove |
| 3,516,562 A | 6/1970 | Knight |
| 3,620,579 A | 11/1971 | Brown et al. |
| 3,690,742 A | 9/1972 | Sung |
| 3,719,403 A | 3/1973 | Sung |
| 3,719,404 A | 3/1973 | Sterner |
| 3,773,197 A | 11/1973 | Blakeley et al. |
| 3,786,949 A | 1/1974 | Sutton |
| 3,837,502 A | 9/1974 | Hornagold |
| 3,844,434 A | 10/1974 | Blakeley et al. |
| 3,858,927 A | 1/1975 | Sutton |
| 3,881,616 A | 5/1975 | Blakeley et al. |
| 3,910,434 A | 10/1975 | Eberling et al. |
| 3,944,092 A | 3/1976 | Eberling et al. |
| 3,985,234 A | 10/1976 | Jouffray |
| 4,016,688 A | 4/1977 | Tiffin et al. |
| 4,045,936 A | 9/1977 | Sterner |
| 4,057,156 A | 11/1977 | Thompson et al. |
| 4,112,649 A | 9/1978 | Fritsch et al. |
| 4,175,903 A | 11/1979 | Carson |
| 4,219,298 A | 8/1980 | Stragier et al. |
| 4,227,849 A | 10/1980 | Worthington |
| 4,257,201 A | 3/1981 | Landolt et al. |
| 4,313,707 A | 2/1982 | Bingman et al. |
| 4,316,695 A | 2/1982 | Knight, Sr. |
| 4,401,407 A | 8/1983 | Breckenridge |
| 4,427,333 A | 1/1984 | Ebeling |
| 4,461,608 A | 7/1984 | Boda |
| 4,543,028 A | 9/1985 | Bell et al. |
| 4,597,710 A | 7/1986 | Kovats |
| 4,669,940 A | 6/1987 | Englehardt et al. |
| 4,708,570 A | 11/1987 | Smith et al. |
| 4,726,726 A | 2/1988 | Dossena et al. |
| 4,759,452 A | 7/1988 | Faint et al. |
| 4,784,278 A | 11/1988 | Luscombe |
| 4,872,801 A | 10/1989 | Yeazel et al. |
| 4,915,570 A | 4/1990 | Rath et al. |
| 4,966,514 A | 10/1990 | Knapp |
| 4,981,411 A | 1/1991 | Ramsey |
| 4,983,092 A | 1/1991 | Richards |
| 5,002,450 A | 3/1991 | Naab |
| 5,007,786 A | 4/1991 | Bingman |
| 5,020,844 A | 6/1991 | Pickrell |
| 5,026,104 A | 6/1991 | Pickrell |
| 5,035,563 A | 7/1991 | Mezey |
| 5,044,863 A | 9/1991 | LaBass et al. |
| 5,049,026 A | 9/1991 | Bingman et al. |
| 5,092,731 A | 3/1992 | Jones et al. |
| 5,163,805 A | 11/1992 | Mezey |
| 5,186,397 A | 2/1993 | Orlando |
| 5,205,698 A | 4/1993 | Mezey |
| 5,209,312 A | 5/1993 | Jensen |
| 5,209,537 A | 5/1993 | Smith et al. |
| RE34,292 E | 6/1993 | Bingman et al. |
| 5,222,853 A | 6/1993 | Carson |
| 5,230,393 A | 7/1993 | Mezey |
| 5,303,841 A | 4/1994 | Mezey |
| 5,304,744 A | 4/1994 | Jensen |
| 5,360,310 A | 11/1994 | Jones et al. |
| 5,391,039 A | 2/1995 | Holtom |
| 5,398,983 A | 3/1995 | Ahrens |
| 5,419,671 A | 5/1995 | Smith et al. |
| 5,470,187 A | 11/1995 | Smith et al. |
| 5,505,576 A * | 4/1996 | Sizemore ............... B65F 3/08 414/408 |
| 5,513,937 A | 5/1996 | Huntoon et al. |
| 5,513,942 A | 5/1996 | Pickrell |
| 5,547,332 A | 8/1996 | Smith et al. |
| 5,551,824 A | 9/1996 | Zanzig et al. |
| 5,562,386 A | 10/1996 | Browning |
| 5,577,877 A | 11/1996 | Smith et al. |
| 5,601,392 A | 2/1997 | Smith et al. |
| 5,651,654 A * | 7/1997 | Christenson ............ B65F 3/046 414/408 |
| 5,702,225 A | 12/1997 | Ghibaudo |
| 5,711,565 A | 1/1998 | Smith et al. |
| 5,720,589 A | 2/1998 | Christenson et al. |
| 5,743,698 A | 4/1998 | Smith et al. |
| 5,755,547 A | 5/1998 | Flerchinger et al. |
| 5,759,008 A | 6/1998 | Smith et al. |
| 5,769,592 A | 6/1998 | Christenson |
| 5,769,594 A | 6/1998 | Kalua |
| 5,775,867 A | 7/1998 | Christenson |
| 5,813,818 A | 9/1998 | McNeilus et al. |
| 5,829,606 A | 11/1998 | Erdmann |
| 5,833,429 A | 11/1998 | McNeilus et al. |
| 5,846,044 A | 12/1998 | Smith et al. |
| 5,863,086 A | 1/1999 | Christenson |
| 5,879,015 A | 3/1999 | Ramsey et al. |
| 5,890,865 A | 4/1999 | Smith et al. |
| 5,919,027 A | 7/1999 | Christenson |
| 5,931,628 A | 8/1999 | Christenson |
| 5,934,858 A | 8/1999 | Christenson |
| 5,934,867 A | 8/1999 | Christenson |
| 5,967,731 A | 10/1999 | Brandt |
| 5,988,970 A | 11/1999 | Holtom |
| 6,004,092 A | 12/1999 | Johnson et al. |
| 6,007,291 A | 12/1999 | Ghibaudo |
| 6,012,895 A | 1/2000 | Smith et al. |
| 6,027,300 A | 2/2000 | Richards |
| 6,071,058 A | 6/2000 | Tetz et al. |
| 6,082,902 A | 7/2000 | Muehlpforte et al. |
| 6,089,813 A | 7/2000 | McNeilus et al. |
| 6,095,744 A | 8/2000 | Harrison |
| 6,174,126 B1 | 1/2001 | Zanzig et al. |
| 6,183,185 B1 | 2/2001 | Zanzig et al. |
| 6,210,094 B1 | 4/2001 | McNeilus et al. |
| 6,213,706 B1 | 4/2001 | Christenson |
| 6,273,632 B1 | 8/2001 | Takahashi et al. |
| 6,350,098 B1 | 2/2002 | Christenson et al. |
| 6,390,758 B1 | 5/2002 | McNeilus et al. |
| 6,428,265 B1 | 8/2002 | Gilmore, Jr. |
| 6,474,928 B1 | 11/2002 | Christenson |
| 6,491,489 B1 | 12/2002 | Stragier |
| 6,494,665 B1 | 12/2002 | Bingman |
| 6,520,008 B1 | 2/2003 | Stragier |
| 6,551,046 B1 * | 4/2003 | Dorrington ............ B65F 3/046 414/408 |
| 6,644,906 B2 | 11/2003 | Bayne |
| 6,655,894 B2 | 12/2003 | Boivin |
| 6,719,226 B2 | 4/2004 | Rajewski |
| 6,726,437 B2 | 4/2004 | Albright et al. |
| 6,761,523 B2 | 7/2004 | Hund, Jr. et al. |

(56) References Cited

U.S. PATENT DOCUMENTS

| | | |
|---|---|---|
| 6,776,570 B1 | 8/2004 | Thobe et al. |
| 6,821,074 B2 | 11/2004 | Schreiber et al. |
| 7,037,061 B2 | 5/2006 | Hund, Jr. et al. |
| 7,066,514 B2 | 6/2006 | Smith et al. |
| 7,070,381 B2 | 7/2006 | Khan et al. |
| 7,086,818 B2 | 8/2006 | Pruteanu et al. |
| 7,293,377 B2 | 11/2007 | Pinther et al. |
| 7,347,657 B2 | 3/2008 | Brunn |
| 7,390,159 B2 | 6/2008 | Rimsa et al. |
| 7,452,175 B2 | 11/2008 | Martin et al. |
| 7,559,732 B2 | 7/2009 | Khan et al. |
| 7,559,733 B2 | 7/2009 | Khan et al. |
| 7,559,734 B2 | 7/2009 | Khan et al. |
| 7,559,735 B2 | 7/2009 | Pruteanu et al. |
| 7,748,908 B2 | 7/2010 | Aira et al. |
| 7,871,233 B2 | 1/2011 | Arrez et al. |
| 8,827,559 B2 | 9/2014 | Gentry et al. |
| 9,556,898 B2 | 1/2017 | Gentry et al. |
| 2001/0001637 A1 | 5/2001 | Zanzig et al. |
| 2002/0159870 A1 | 10/2002 | Pruteanu et al. |
| 2003/0152454 A1 | 8/2003 | Albright et al. |
| 2003/0175104 A1 | 9/2003 | Pruteanu |
| 2005/0232736 A1 | 10/2005 | Fellows et al. |
| 2005/0274867 A1 | 12/2005 | Kincaid |
| 2006/0280582 A1 | 12/2006 | Kouri |
| 2008/0199290 A1 | 8/2008 | Traylor |
| 2009/0028477 A1 | 1/2009 | Fink et al. |
| 2009/0067965 A1 | 3/2009 | Martin et al. |
| 2009/0317219 A1 | 12/2009 | Pruteanu et al. |
| 2010/0209181 A1 | 8/2010 | Gokita |
| 2010/0322749 A1 | 12/2010 | Rowland et al. |
| 2011/0038697 A1 | 2/2011 | Arrez et al. |
| 2011/0243692 A1 | 10/2011 | Fortin et al. |
| 2012/0128280 A1 | 5/2012 | Ortiz et al. |
| 2013/0039728 A1 | 2/2013 | Price et al. |
| 2014/0056637 A1 | 2/2014 | Gentry et al. |

FOREIGN PATENT DOCUMENTS

| | | | |
|---|---|---|---|
| DE | 102005018476 | 10/2006 | |
| GB | 1169911 | 11/1969 | |
| GB | 2134072 A | 8/1984 | |
| JP | 2011-152975 | 8/2011 | |
| SU | 1079778 | 3/1984 | |
| SU | 1110724 A * | 8/1984 | ................ B65F 3/04 |
| WO | WO-9312019 A1 * | 6/1993 | ................ B65F 3/22 |

* cited by examiner

TELESCOPIC ARM FOR A REFUSE VEHICLE

CROSS-REFERENCE TO RELATED APPLICATIONS

This application is a divisional of U.S. patent application Ser. No. 14/452,842, filed Aug. 6, 2014 (now U.S. Pat. No. 9,556,898), which is a divisional of Ser. No. 13/790,257 filed on Mar. 8, 2013 (now U.S. Pat. No. 8,827,559), which claims the benefit of U.S. Provisional Application No. 61/692,378, filed on Aug. 23, 2012. The entire disclosures of the above applications are incorporated herein by reference.

FIELD

The present disclosure relates to refuse collection vehicles and, more particularly, to a side loading collection arm for the refuse collection vehicle.

BACKGROUND

Various types of refuse collection vehicles exist in the art. These vehicles include numerous types of pick up or collection arms. The collection arms usually move from a pick up position, picking up a garbage can at the curb, to a dump position, dumping the garbage can in a hopper. Ordinarily, these arms include various types of linkages to move the arm from one position to the other. These linkages utilize a number of parts as well as hydraulic cylinders. Due to the movement from one position to the other, the collection arms can be very complicated and include numerous parts. While these arms work satisfactory for their intended purpose, designers strive to improve the art.

When these collection arms require significant maintenance, it generally requires the entire collection arm being removed from the vehicle. Thus, this requires significant down time of the vehicle. Also, due to their complexity, the collection arms are substantially heavy and add additional weight to the vehicle. Also, the arms are non-symmetrical so that they can only be positioned on one side of the vehicle.

The present disclosure provides the art with a refuse collection vehicle that overcomes the shortcomings of the prior devices. The present disclosure provides the art with a telescoping collection arm that includes a mounting assembly that enables vertical movement of the collection arm. In addition, the mounting assembly may slide along a track to provide additional horizontal movement of the arm. The pick-up arm can be quickly removed from the mounting assembly for replacement or substitution of other like arms. The collection arm and the mounting assembly are coupled with the vehicle body container to enable the collection arm to pivot with respect to the container.

SUMMARY

According to the disclosure, a telescopic arm for a refuse vehicle comprises an outer boom with a hollow bore. An inner bore is received in the hollow bore of the outer boom. A mounting assembly secures the outer boom with the refuse vehicle. A plurality of bearing pads is positioned between the inner and outer booms. The plurality of bearing pads contacts an inner surface of the outer boom defining the hollow bore. A plurality of shims are associated with the bearing pads. The shims assure a tight fit between the inner and outer booms. The outer and inner boom, in cross-section, have an overall U-shape portion with legs at an obtuse angle with respect to the web. The mounting assembly includes a pin inserted into a bracket on the refuse vehicle. A plate is coupled with the pin to maintain the pin in the bracket. A bearing slides over the pin to provide a bearing surface and enable quick change of the mounting assembly. A bearing pad bracket receives bearing pads. The bearing pad bracket has an overall U-shape with the legs and web including apertures to receive a pad. A tongue extends into the apertures to retain the pads on the bracket. The shims include a body having a pair of legs connected by a web. A tab extends from the web and is substantially perpendicular to the web. An attachment mechanism enables securement of the shims to the outer or inner boom.

Accordingly to a second object, a mounting assembly for a refuse container boom comprises a pin inserting into a bracket on the refuse vehicle. A plate is coupled with the pin to maintain the pin in the bracket. A bearing slides over the pin to provide a bearing surface and enable quick change of the boom on the mounting assembly.

According to another aspect of the disclosure, a bearing pad bracket for the refuse container boom comprises a body with an overall U-shape. The legs and web include apertures to receive a bearing pad. A tongue extends into the apertures to retain the pads on the bracket.

According to another aspect of the disclosure, a shim for a refuse container boom comprises a body having a pair of legs connected by a web. A tab extends from the web. The tab is substantially perpendicular to the web. An attachment mechanism enables securement of the shim to the boom.

Accordingly to a further aspect of the disclosure, a bearing pad bracket for a refuse container boom comprises a body having a first aperture to receive a bearing pad. A tab extends from the body. The tab is angled with respect to the body. A second aperture is formed between the body and tab. The second aperture enables passage of a shim. A mechanism is on the bracket to enable the bracket to be coupled with the boom.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
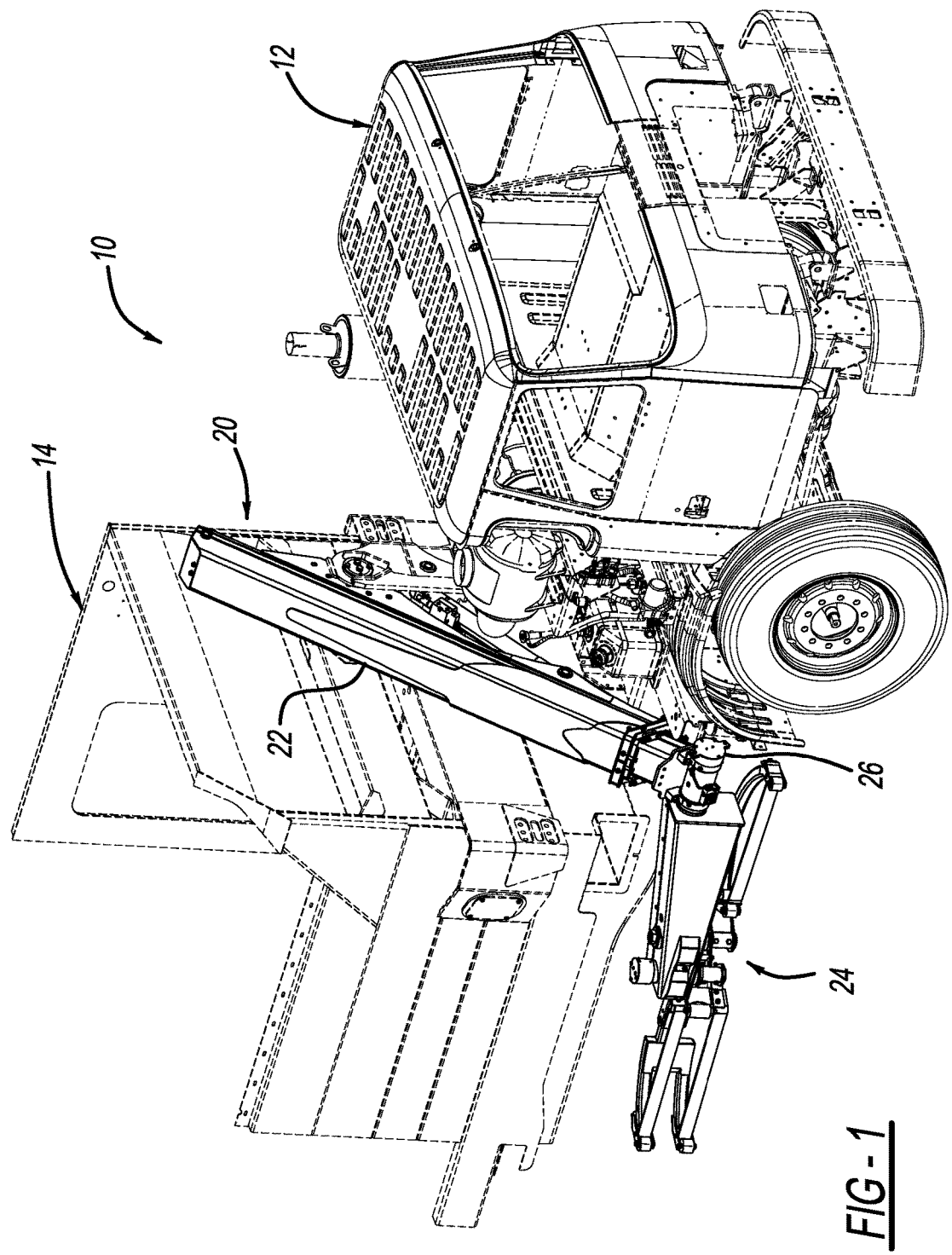
FIG. 1 is a perspective view of a refuse vehicle with a side arm collection device.

Turning to the figures, FIG. 1 illustrates a refuse vehicle designated with the reference numeral 10. The refuse vehicle 10 includes a cab 12 and a refuse container 14. A telescopic arm 20 is secured with the container 14. The telescopic arm 20 includes a boom section 22 and a grabber 24. The grabber 24 is coupled with the boom section 22 via a rotary actuator 26. The boom section 22 is connected, generally via hydraulic lines, with the refuse vehicle hydraulic system to move the telescopic arm between positions.

The telescopic arm 20 boom section 22 includes an outer boom 28 and an inner boom 30. The outer boom 28 includes a cylinder mounting portion 32 as well as a mounting assembly 34. The mounting assembly 34 pivotally secures the outer boom 28 with the container 14. The outer boom 28 is an elongated hollow member having a polygonal shape in cross section. In cross section, a top portion is U-shaped with its legs substantially perpendicular to its web. In a bottom portion, it has an overall U-shaped with its legs 38 at an obtuse angle with respect to its web 40. This bottom U-shaped portion enables the inner boom 30 to be self-centered and slide within the outer boom 28. Additionally, the U-shape enables loads to be applied perpendicularly onto the pads. Thus, this provides a larger contact surface between the boom and pads.

The inner boom 30 is an elongated member and has a cross-section shape similar to the outer boom 28. The inner boom 30, in cross section, has a top half that includes a web 42 and legs 44 that are substantially perpendicular to the web 42. A bottom portion, in cross section, has an U-shaped with legs 46 extending from web 48 at an obtuse angle. Thus, the bottom U-shaped portion enables centering of the inner boom in the outer boom 28.

The mounting assembly 34 includes a bracket 50 coupled with the container 14. The bracket 50 includes a first member 52 and a second member 54. The first member 52 includes an aperture 56 to receive and mount the end of the cylinder 58, that is couples at its other end with the mounting portion 32 of the outer boom 28. The first member 52 includes a second aperture 60. The bracket 50 may be fixed or movable on the container. Additionally, the second member 54 includes a bore 62. The bores 60, 62 receive a pin assembly 64.

Figure 2:
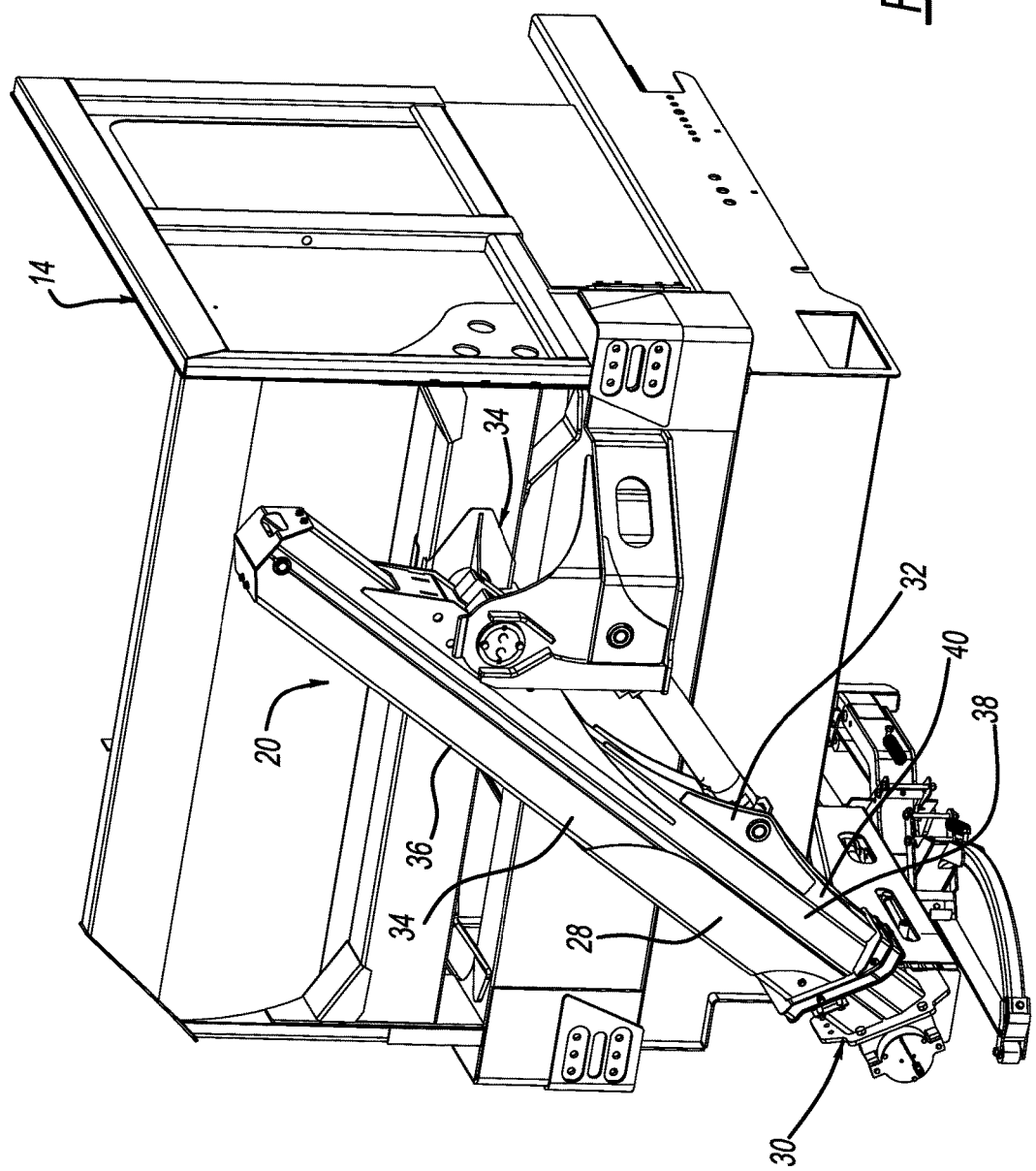
FIG. 2 is a perspective view of the telescoping boom.
Figure 3:
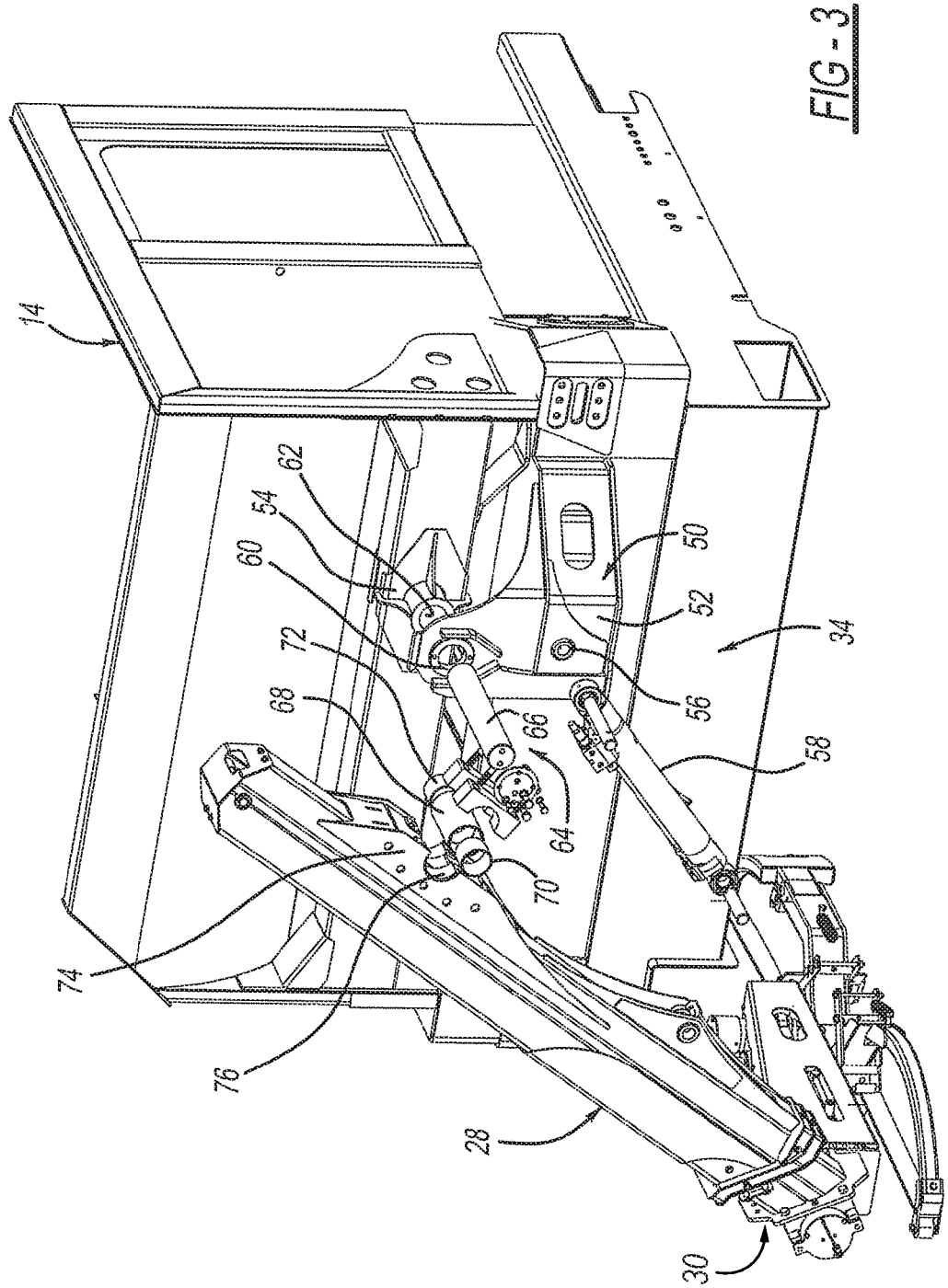
FIG. 3 is a perspective view partially exploded like the view of FIG. 2.
Figure 4:
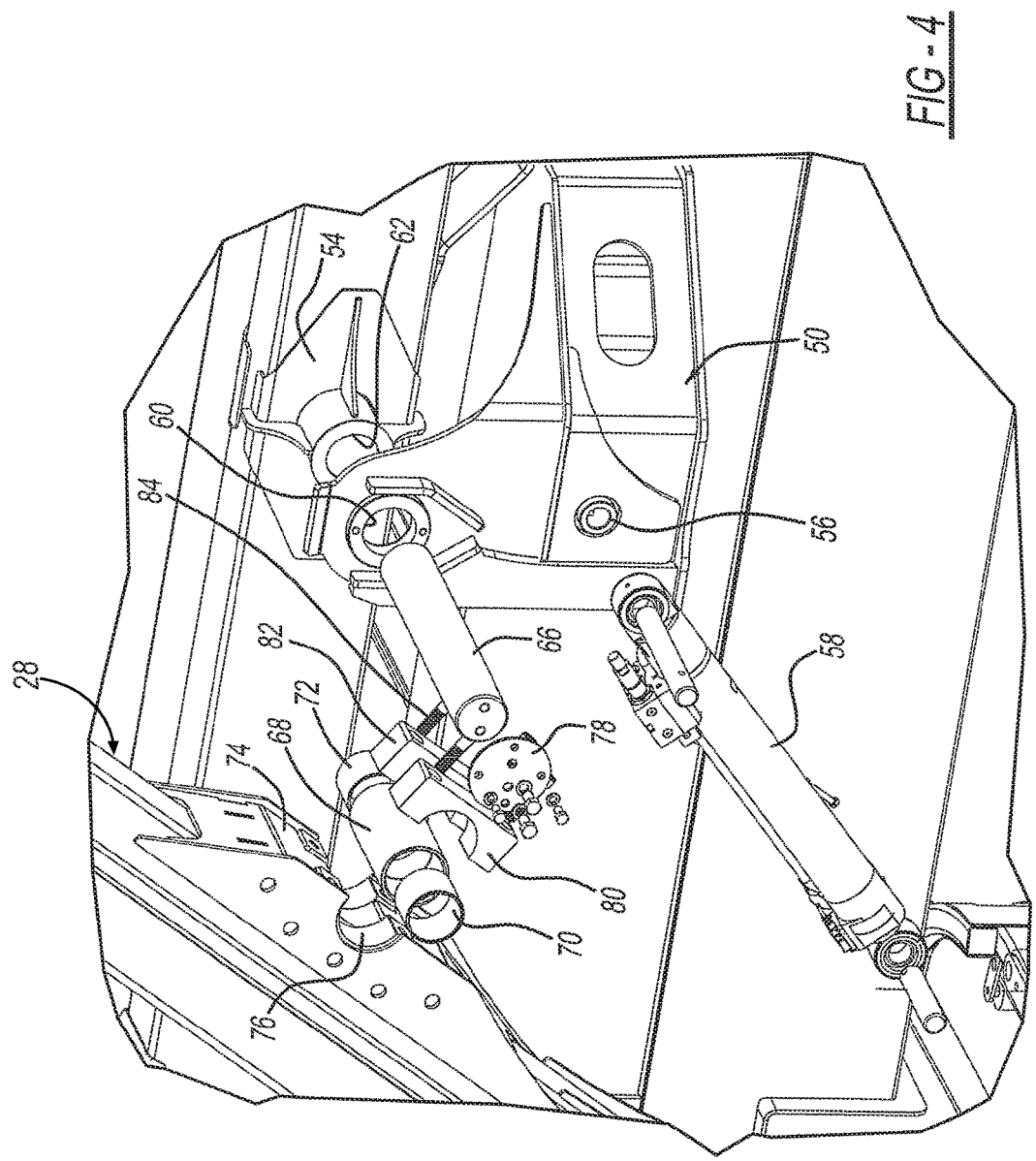
FIG. 4 is an enlarged perspective exploded view of a mounting mechanism.
Figure 5:
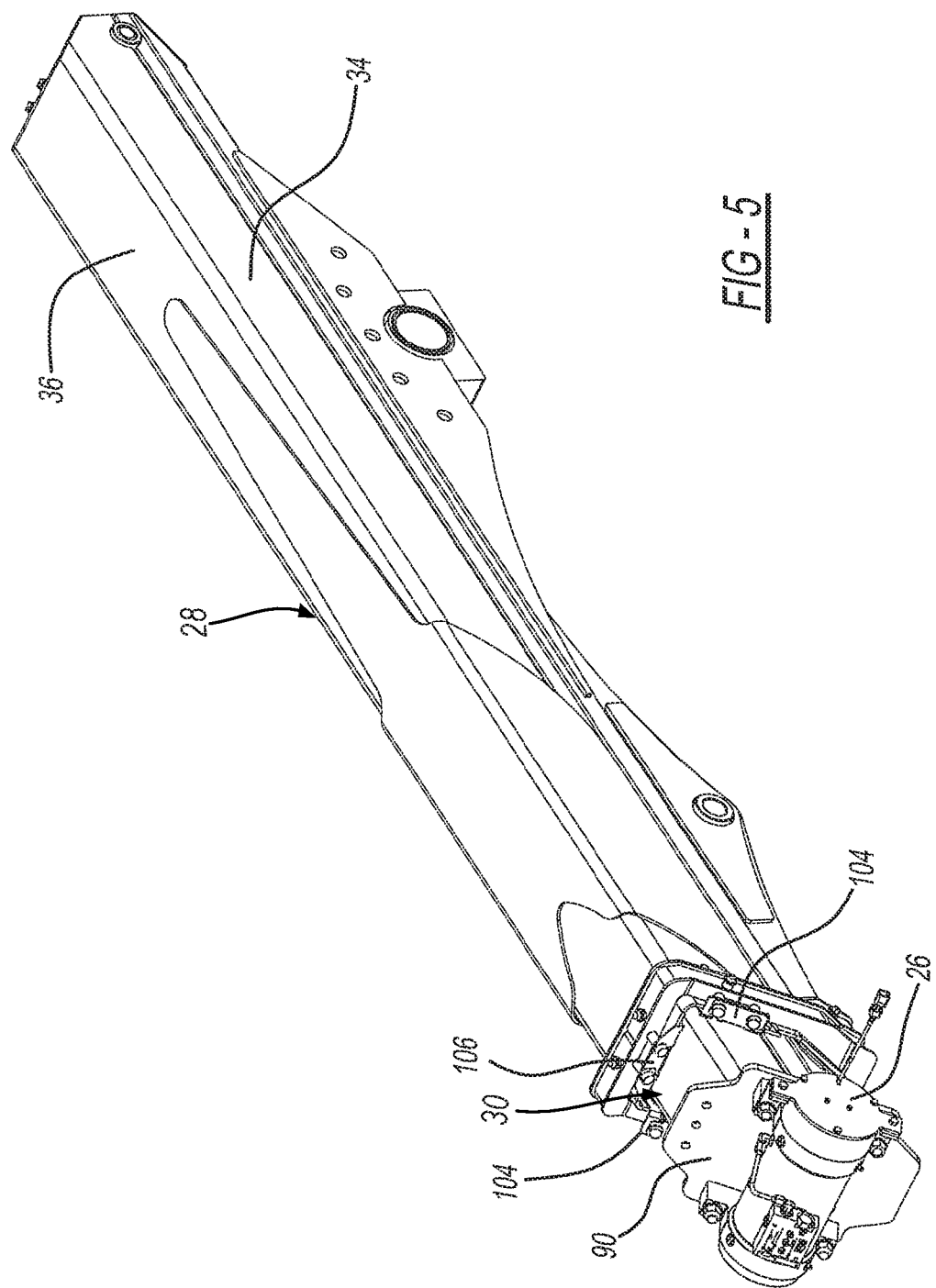
FIG. 5 is a perspective view of the boom of the collection arm.
Figure 6:
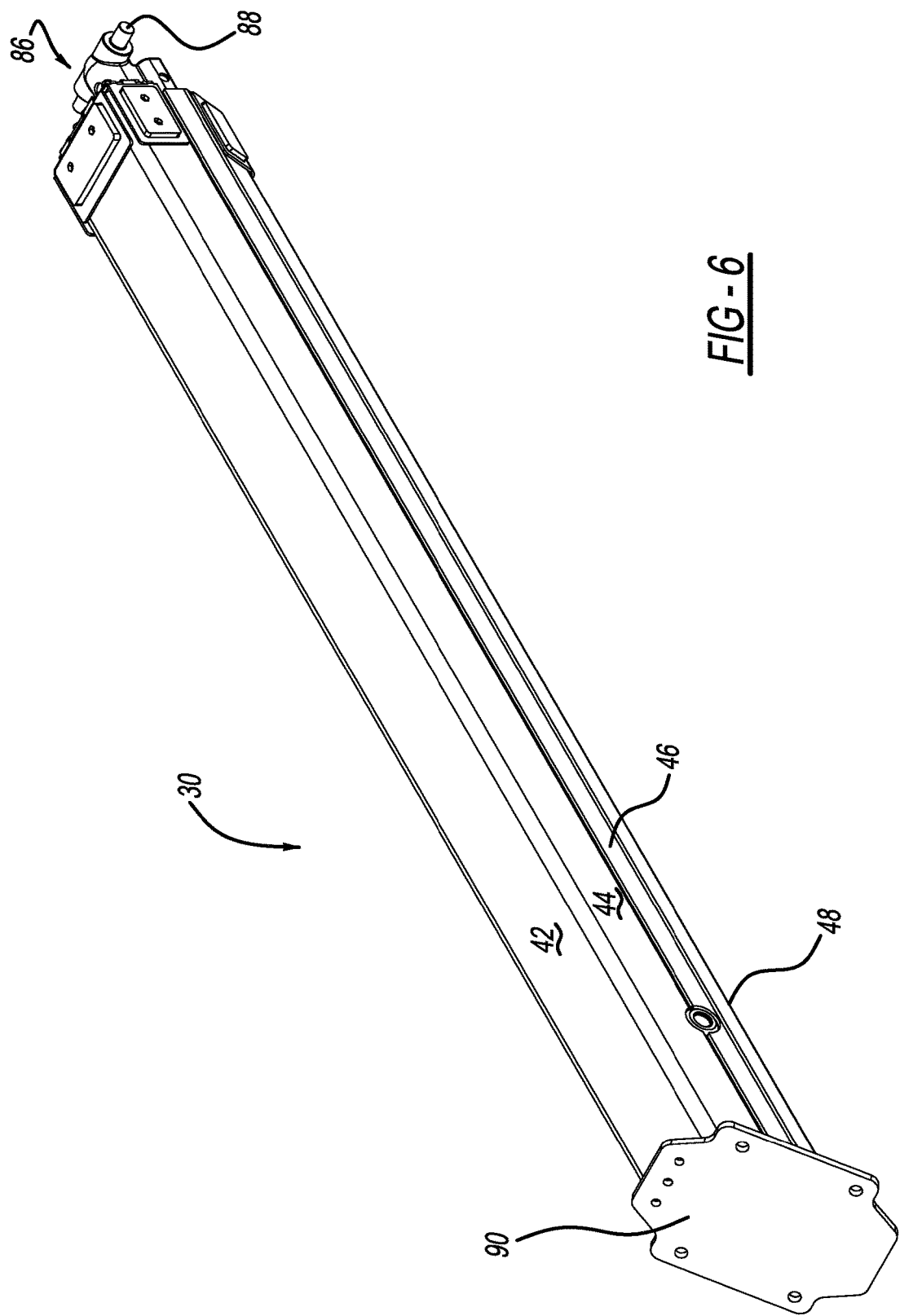
FIG. 6 is a perspective view of the inner boom.
Figure 7:
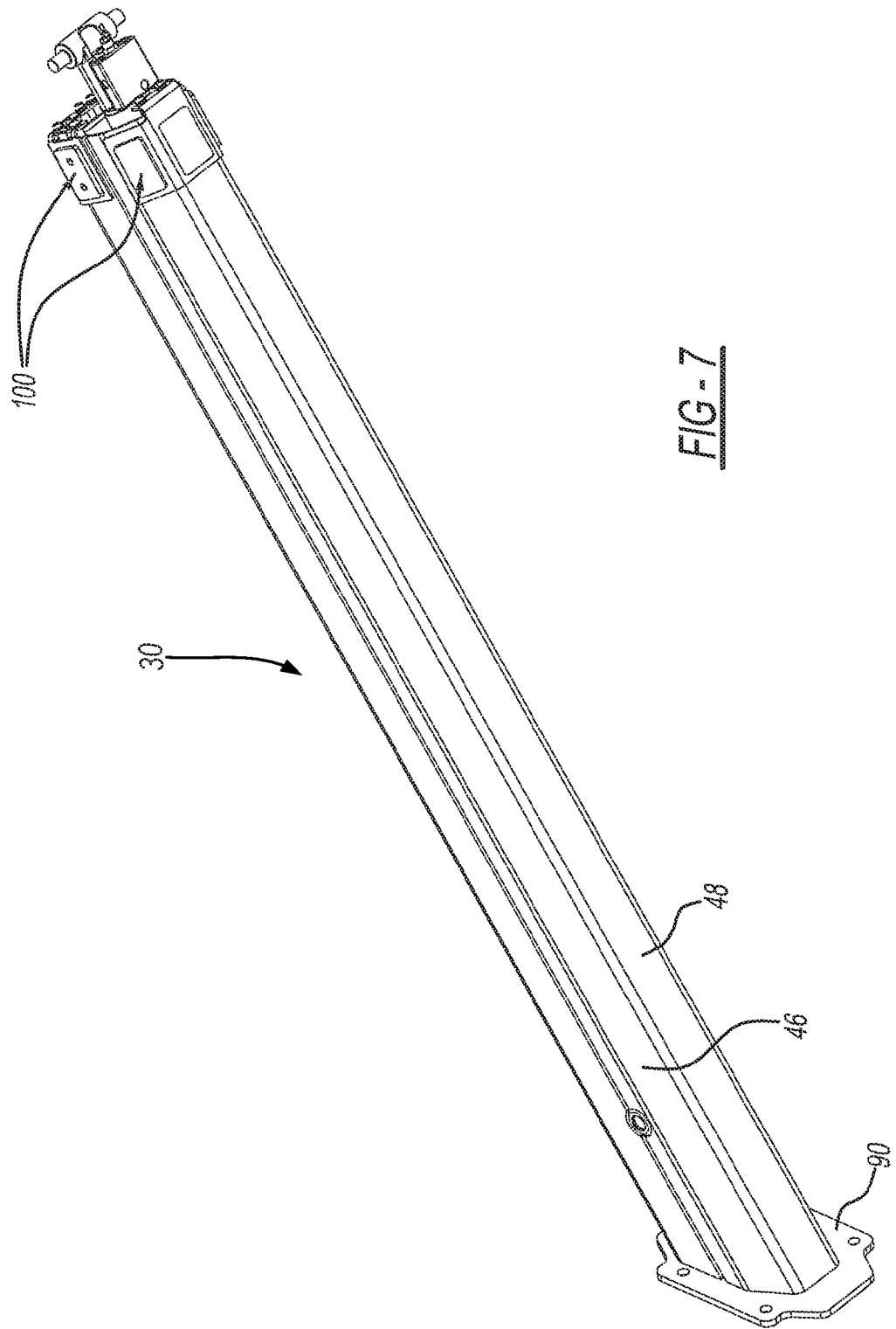
FIG. 7 is a bottom perspective view of the boom of FIG. 6.
Figure 8:
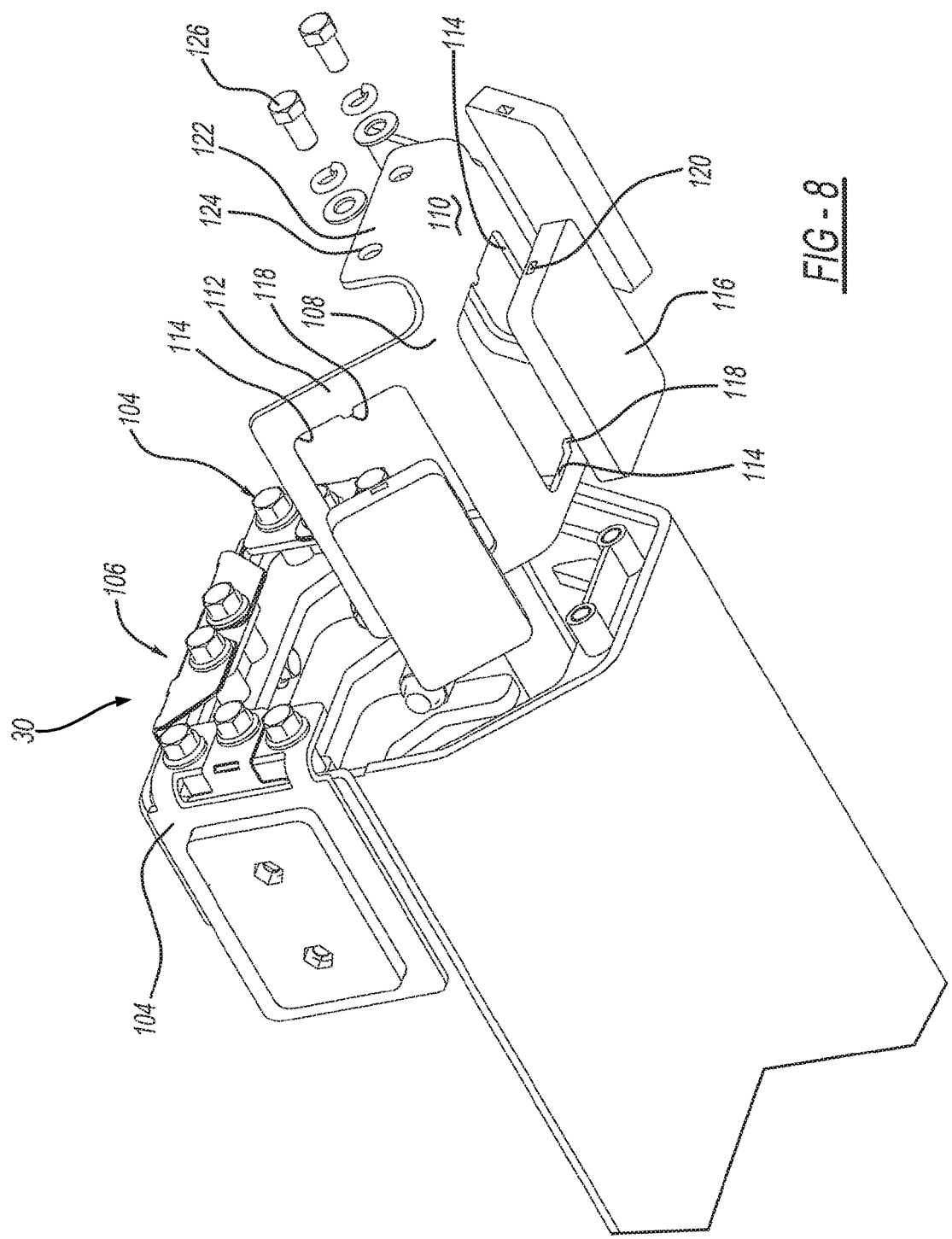
FIG. 8 is a partially exploded view of an end of the inner boom.
Figure 9:
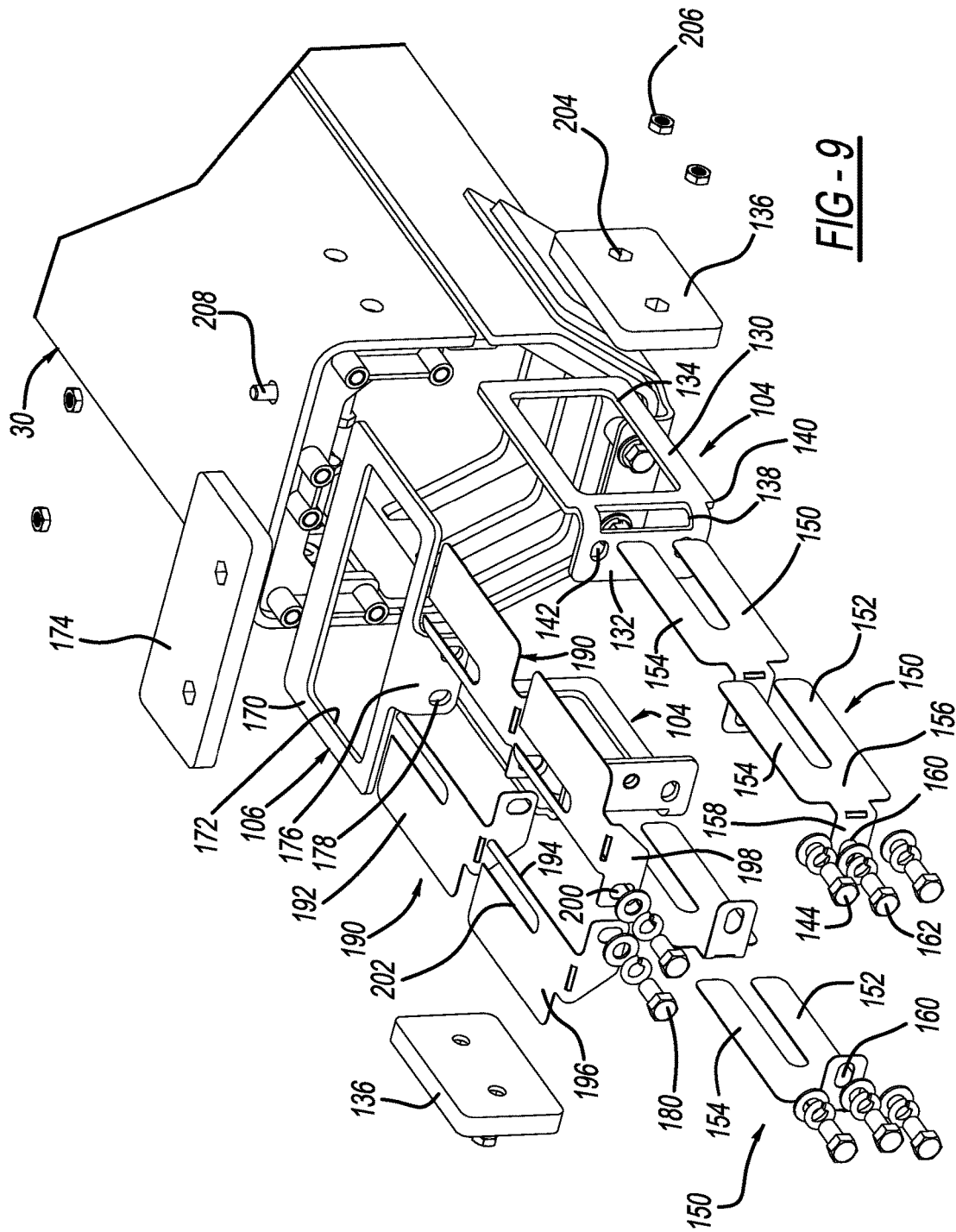
FIG. 9 is a perspective partially exploded view of an end of the inner boom.

The pin assembly 64 provides a journal 66 to enable pivoting of the outer boom with respect to the container 14. The pin assembly 64 journal 66 has at least one shown as three, cylindrical bearing members 68, 70, 72. The bearing members 68, 70, 72 are formed from a plastic material to provide a bearing surface. The bearing members 68, 70, 72 are positioned over the journal 66 and pass through the apertures 60, 62 in the brackets. The bearings 70, 72 are received in the bores 60, 62 of the bracket 50. The bearing member 68 is received into the mount 74 on the outer boom 28. The mount 74 includes a circular cutout 76 that is positioned on the bearing when its assembled as illustrated in FIG. 2. Additionally, a plate 78 is secured to the journal 66. The plate 78 acts as a puller plate in a case where the journal freezes or locks in the bracket 50 so that the journal 66 can be removed from the bracket to enable rapid replacement of the telescopic arm 20. A pair of pillow blocks 80, 82 is secured with the mount 74 by a plurality of bolts 84. The telescopic arm 20 is thus pivotably secured to the bracket 50 for pivotal movement of the boom section 22 with respect to the container 14.

A cylinder 86 is positioned inside of the inner boom 30. The cylinder 86 includes an end portion 88 that secures with the outer boom portion 28 so that the inner boom can be articulated telescopically within the outer boom 28. The inner boom 30 includes a plate 90 that receives the rotary actuator 26.

The inner boom 30 includes a plurality of bearing pads 100 for enabling sliding movement between the inner boom 30 and the outer boom 28. The bearing pads 100 are held onto the inner boom 30 by brackets 102, 104, 106.

The bracket 102 has a body 108 with an overall U-shaped including a web portion 110 and legs 112. The web portion 110 includes an aperture 114 to receive bearing pad 100. Tongues 118 project inward from an edge of the wall defiling the aperture 114. The tongues 118 couple with cutouts 120 in the pad 100 to retain the bearing pad 100 in the aperture 114. The apertures 114 on the legs 112 are the same as those on the web 110 and are identified with the same reference numerals. The bracket 102 includes a tab 122 that is substantially perpendicular to the web 110. The tab 122 includes apertures 124 to receive fasteners 126 to retain the bracket 102 on the inner boom 28.

The brackets 104 have an overall L-shape with a first leg 130 and a second leg 132. The first leg 130 includes an aperture 134 to receive a bearing pad 136. The second leg 132 is substantially perpendicular to the leg 130. The second leg 132 includes an aperture 138 at the bend 140 between the two legs 130, 132. The aperture 138 receives shims 150. The second leg 132 also includes apertures 142 that receive fasteners 144 to retain a bracket 104 onto the inner boom 28.

Shims 150 have an overall U-shaped with a pair of legs 152, 154, defining a slot 155, and a web 156. The web 156 includes a tab 158 that includes an aperture 160 that enables passage of a fastener 162. The shims 150 are passed through the aperture 130 to compensate for the manufacturing variances to provide a tight fit between the outer boom 28 and inner boom 30 once they are assembled together. A plurality of shims 150 can be passed through the aperture 138 to provide for adjustability.

The bracket 106 has a plate 170 with an aperture 172 to receive the bearing pad 174. A tab 176 projects substantially perpendicular to the plate 170. Tab 176 includes apertures 178 to enable fasteners 180 to pass through the aperture to secure the bracket 106 with the inner boom 30. A plurality of shims 190 are passed under the bracket 106 and bearing pad 174. The shims 190 have an over U-shaped with legs 192, 194, with one larger than the other, connected by web 196. A tab 198 extends substantially perpendicular from the web 196. The tab 198 includes an aperture 200 to receive the fasteners 180. The shims include a slot 202 between the legs 192, 194.

The bearing pads 136, 174 include hexagonal apertures 204 to receive nuts 206 to retain the bearing pads 174, 136 on the inner boom 30. Bolts 208 pass out of the inner boom 30 to threadably couple with the nuts 206 to retain the pads 174, 136.

During assembly, the brackets 102, 104 and 106 are positioned onto the inner boom 30. The bracket 102 with bearing pads 116 is secured with the inner boom 30. Since fasteners are unable to pass through the inner boom 28 at this position, the bearing pads 116 are snapped into the bracket 102 via the tongues 118.

The brackets 104, 106 are loosely secured to the inner boom 30. Additionally, the bearing pads 136, 174 are loosely secured onto the inner boom 30. The shims 150, 190 are positioned underneath the pads 136, 179 with the slots 155, 202 surrounding the bolts 208. Any number of shims 150, 190 can be passed underneath the pads 136, 174 to account for the manufacturing variances. After a satisfactory fit is achieved, the nuts are tightened down to secure the brackets 102, 104, 106, shims 150, 190 and bearing pads 136, 174 with the inner boom 30.

Figure 10:
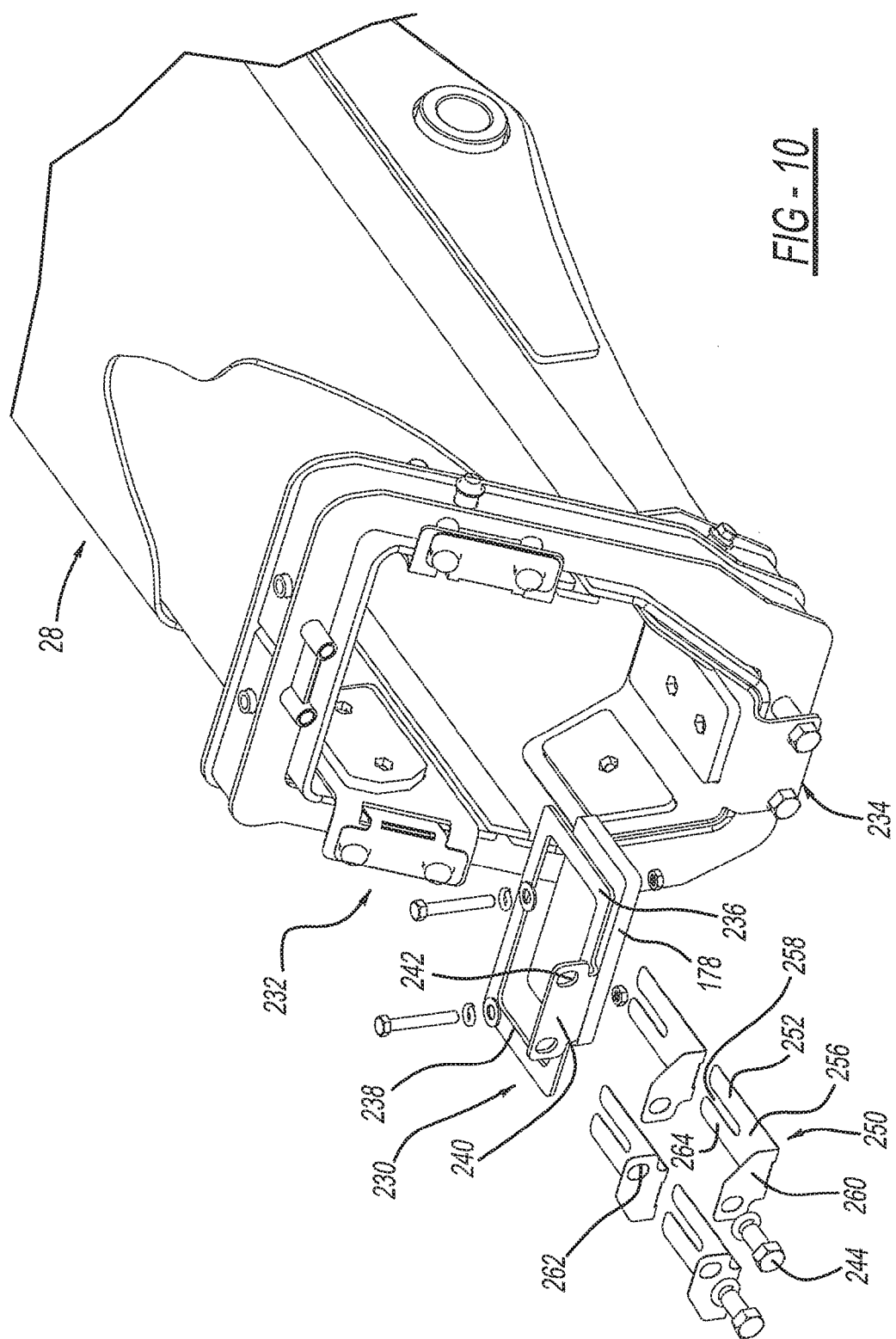
FIGS. 10-12 are perspective partially exploded views of an end of the outer boom.
Figure 11:
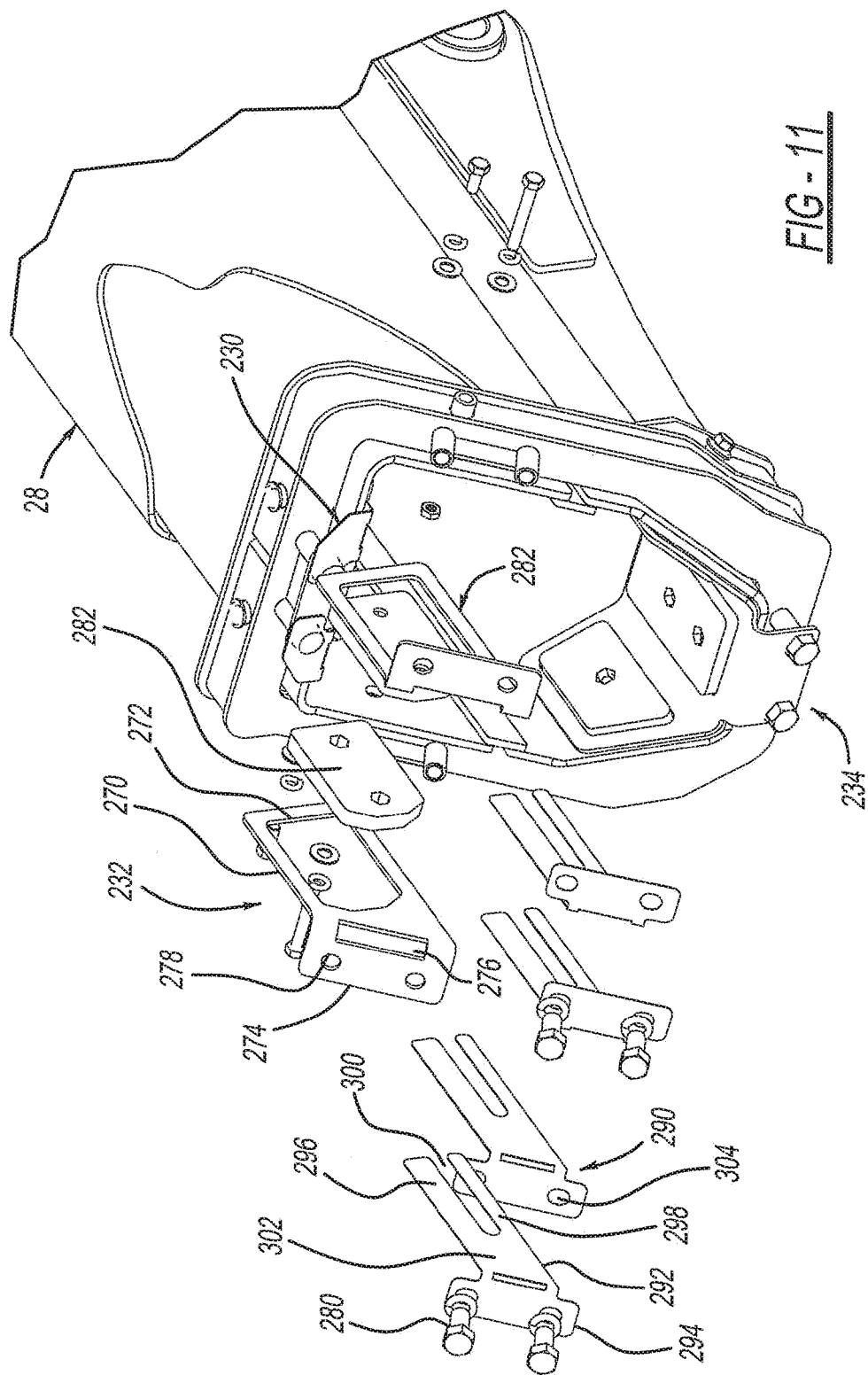
Figure 12:
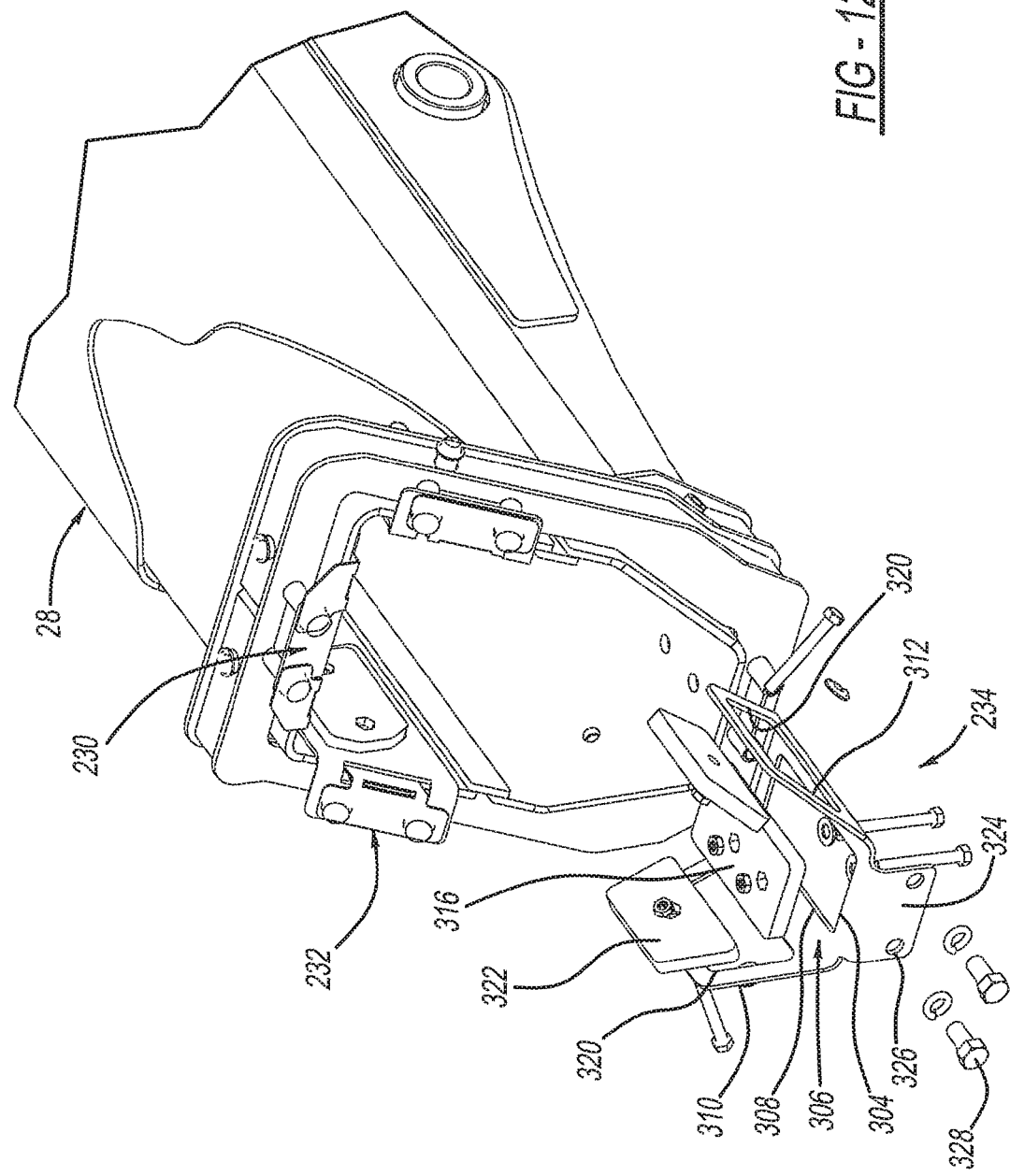

Turning to FIGS. 10-12, brackets with bearing pads for the outer boom 28 are illustrated. The outer boom 28 includes bearing brackets 230, 232 and 234. Bearing bracket 230 includes a frame 236 with an aperture 238 to receive bearing pad 176. A tab 240 extends perpendicular to the frame 236. The tab 240 includes apertures 242 to receive bolts 244 to retail the bracket 230 on the outer boom 28. Shims 250 are positioned underneath the bracket to account for manufacturing variations. The shims 250 have an overall U-shape with legs 252, 254 connected by web 256. A slot 258 is formed between the legs 252, 254. A tab 260 extends substantially perpendicular from the web 266. Also, the tab includes an aperture 262 to receive bolt 244 to secure the shims 250 with the outer boom 28.

Brackets 232 include a frame 270 with an aperture 272. A tab 274 extends from the frame 270. The tab 274 is angled with respect to the longitudinal axis of the frame 270. Also, the tab 274 is bent to be substantially perpendicular to the frame 270. The tab 274 includes an aperture 276 to receive shims 290. The tab 274 also includes apertures 278 that receive bolts 280 to retain the brackets 232 on the outer boom 28. A bearing pad 282 is positioned into the aperture 272. The bearing aperture 282 has hexagonal apertures to receive a nut which, in turn, receives bolts to retain the bearing pad 282 onto the inner surface of the outer boom 28.

The shims 290 have an overall L-shape with a first leg 292 and a second leg 294. The first leg 292 has an overall U-shaped with legs 296, 298 defining a slot 300. The legs 296, 298 are connected by a web 302. The second leg 294 extends from the web 302. The second leg 294 includes apertures 304 to receive bolts 280 to retain the shims 290 on the outer boom 28. The second leg 294, while being perpendicular to the first leg 292, is also angled with respect to the longitudinal axis of the first leg 292. This enables the connection of the shims 290 with the outer boom 28.

The shims 150, 190, 250, 290 are able to be added without disassembly of the booms. Thus, this accounts for pad wear and enables faster change time.

The bracket 234 is similar to bracket 102. The bracket 234 includes a frame 306 with an overall U-shaped including a web 308, and legs 310, 312. The web 308 includes an aperture 314 that receives a bearing pad 316. The bearing pad 316 is bolted onto the outer boom 28. The legs 310, 312 likewise include an aperture 320 to receive bearing pads 322. The bearing pads 322 are also bolted onto the outer boom 28. A tab 324 extends from the web 308. The tab 324 is substantially perpendicular to the web 308. The tab 324 includes apertures 326 that receive bolts 328 to retain the bracket 234 on the outer boom 28.

The bracket 234 is attached to the outer boom 230 with the bearing pads 316, 322 secured in place. The brackets 232, 234 are loosely secured to outer boom 28. The shims 290, 250 are positioned underneath the bearing pads 176, 282. Once the inner boom 30 is in place and a tight fit is assured, the bolts are tightened to maintain the brackets 232, 234 and bearing pads 176, 282 in place.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing pad bracket for a side arm of a refuse container vehicle, comprising:
    a U-shaped body having opposing legs at an obtuse angle relative to a web extending between the legs, at least one of the legs and the web including an aperture configured to receive a bearing pad and at least one tongue extending into the aperture to retain the bearing pad on the bracket.

2. The bearing pad bracket according to claim 1, further comprising a second bracket having a body which has a first aperture configured to receive a bearing pad, a tab extending the body, the tab angled relative to the body, a second aperture between the body and the tab, the second aperture configured to receive at least a portion of one or more shims, and a mechanism on the bracket for enabling configured to couple the bracket to be coupled with a boom of the side arm.

3. The bearing pad bracket according to claim 1, wherein the legs and the web of the body comprise a contiguous, monolithic structure.

4. The bearing pad bracket according to claim 1, wherein the web includes the aperture, and wherein each of the legs include separate apertures configured to receive separate bearing pads.

5. The bearing pad bracket according to claim 1, wherein the at least one tongue is configured to be received by an opening in a side wall of the bearing pad.

6. The bearing pad bracket according to claim 1, wherein the at least one tongue comprises a first tongue extending into a first end of the aperture; and further including a second tongue extending into a second end of the aperture opposite the first end.

7. The bearing pad bracket according to claim 1, wherein the at least one tongue projects inward from an edge of a wall defining the aperture.

8. The bearing pad bracket according to claim 1, further comprising a tab extending from the web, the tab being spaced apart from the legs, and wherein the tab is configured for coupling the bracket to a portion of the side arm.

9. The bearing pad bracket according to claim 8, wherein the tab comprises one or more apertures configured to receive a mechanical fastener.

10. A bearing pad bracket for a side arm of refuse container vehicle comprising:
    a body having a first aperture configured to receive a bearing pad;
    a tab extending the body, the tab angled relative to the body;
    a second aperture between the body and the tab, the second aperture configured to receive at least a portion of one or more shims; and
    a mechanism on the bracket configured to couple the bracket to be coupled with a boom of the side arm.

11. The bearing pad bracket according to claim 10, wherein the second aperture resides at a bend between the tab and the body.

12. The bearing pad bracket according to claim 10, wherein the tab comprises a surface configured to support a surface of the one or more shims.

13. The bearing pad bracket according to claim 10, wherein the second aperture is configured to receive a plurality of shims.

14. The bearing pad bracket according to claim 10, wherein the mechanism comprises at least one aperture on the tab, the aperture configured to receive a mechanical fastener.

15. A bearing pad bracket for a side arm of refuse container vehicle, comprising:
- a body having an aperture configured to receive a bearing pad;
- a tab extending from the body, the tab angled relative to the body, and the tab comprising a surface configured to support a surface of one or more shims; and
- a mechanism on the bracket configured to couple the bracket with the one or more shims and a boom of the side arm.

16. The bearing pad bracket according to claim 15, wherein the mechanism comprises at least one aperture on the tab configured to receive a mechanical fastener.

17. The bearing pad bracket according to claim 15, wherein a width of the body is larger than a width of the tab, and wherein the tab is approximately centered along the width of the body.

* * * * *